April 16, 1946.  L. E. NORTON  2,398,552
DIRECTION FINDER
Filed Dec. 31, 1942   5 Sheets-Sheet 1
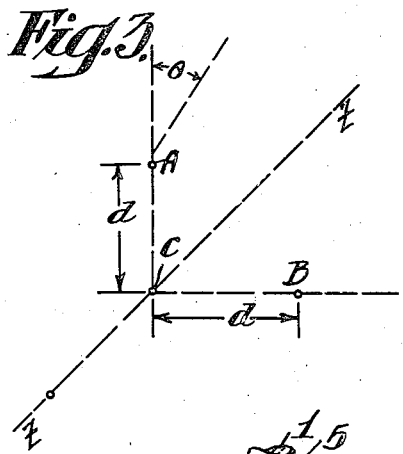
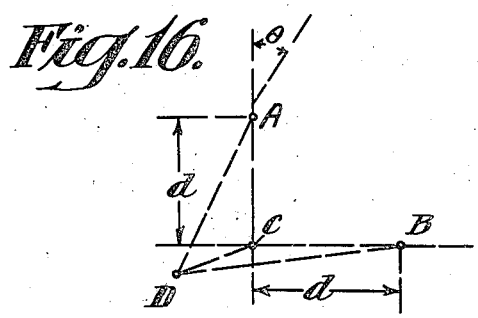
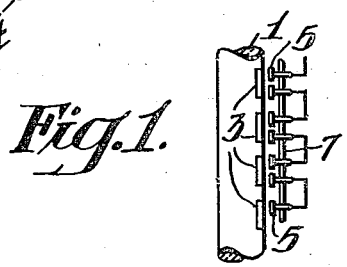
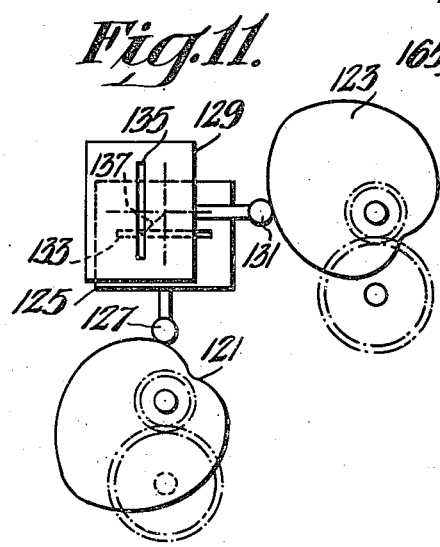
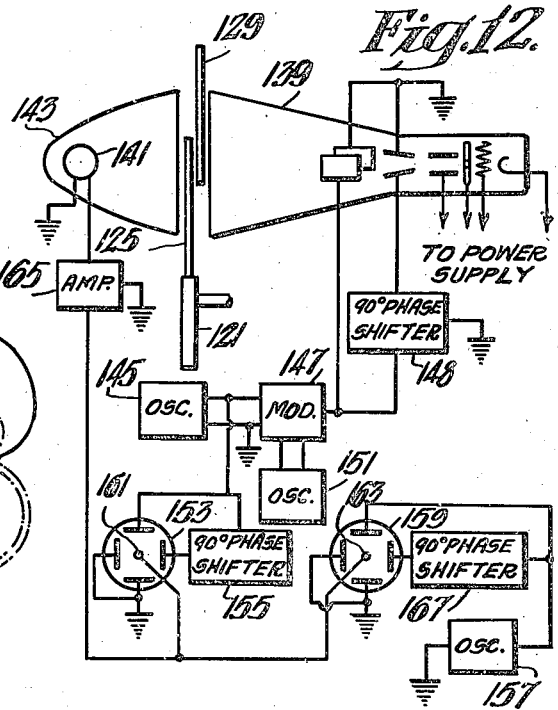
Inventor
Lowell E. Norton
By
Attorney

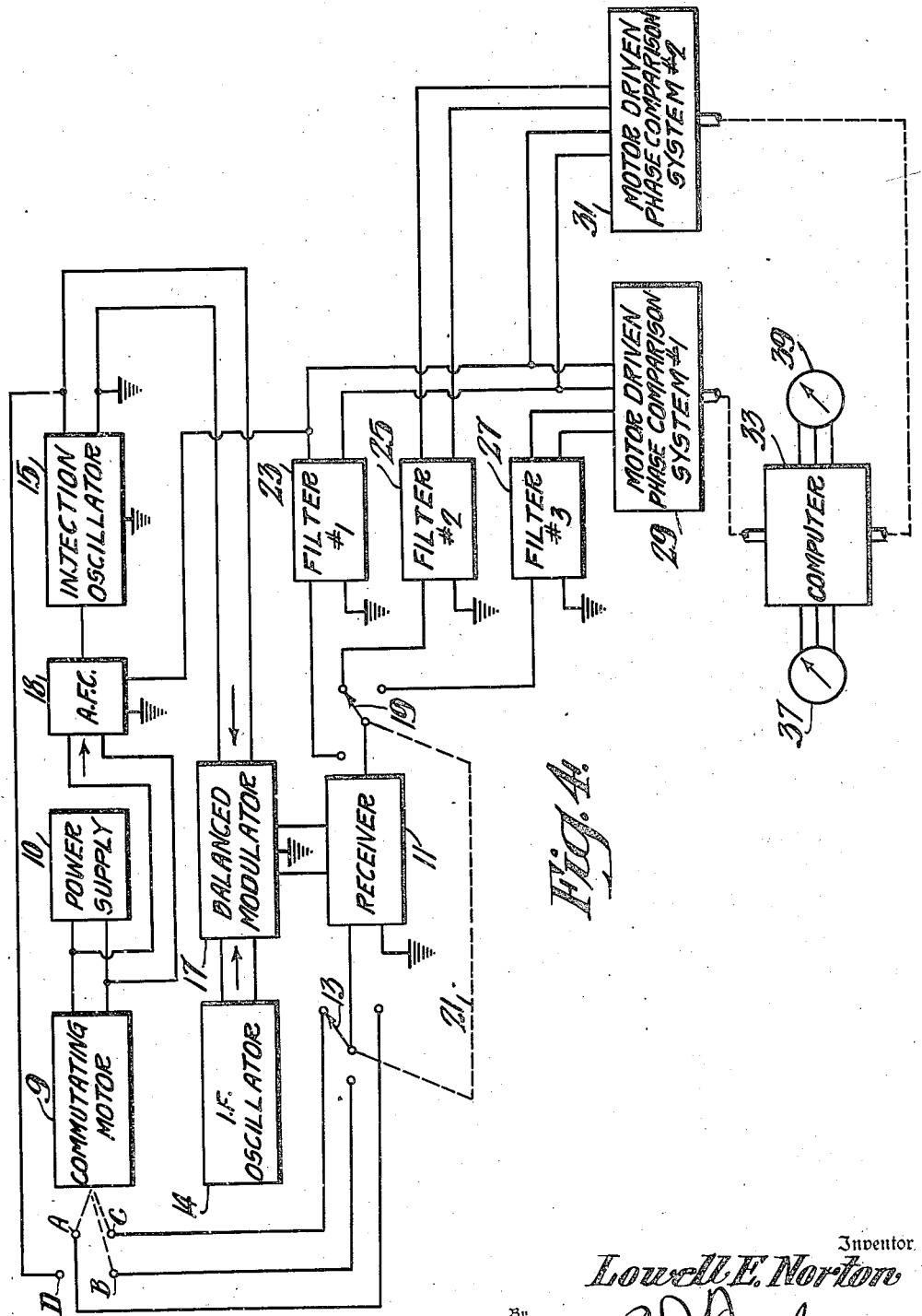

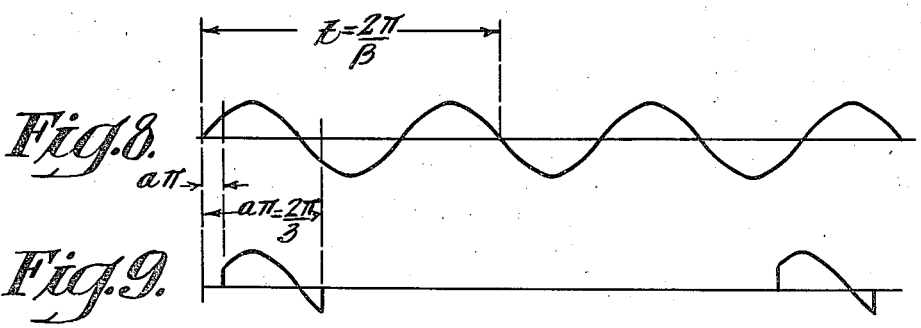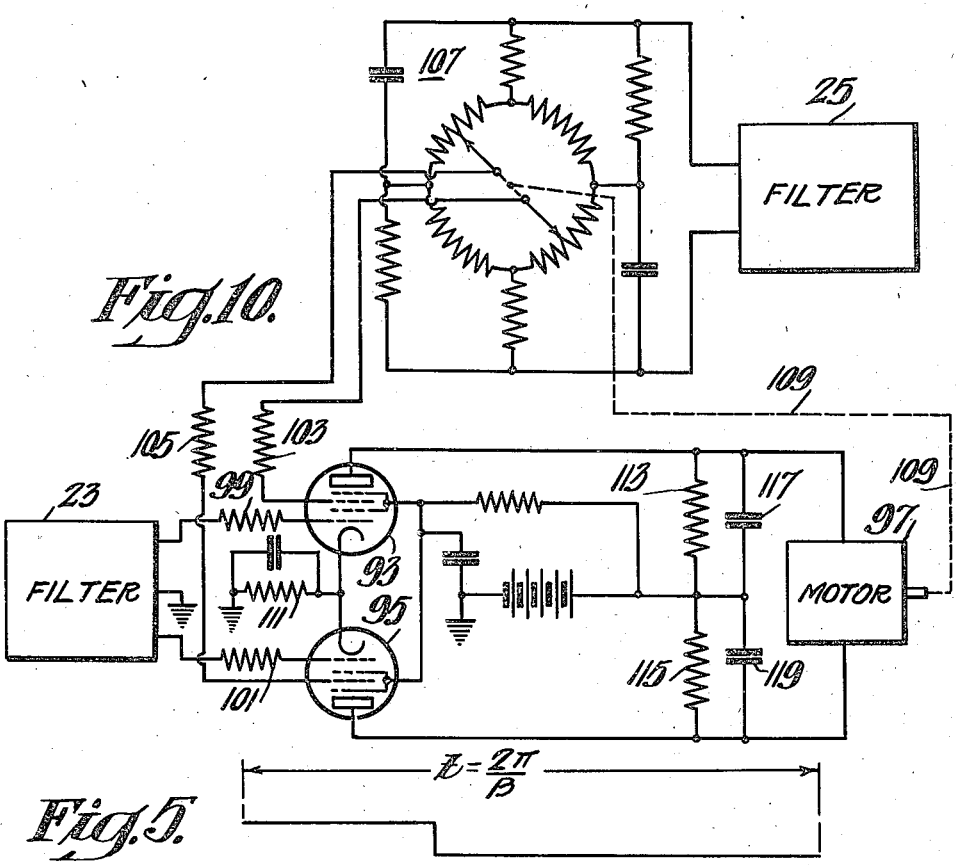

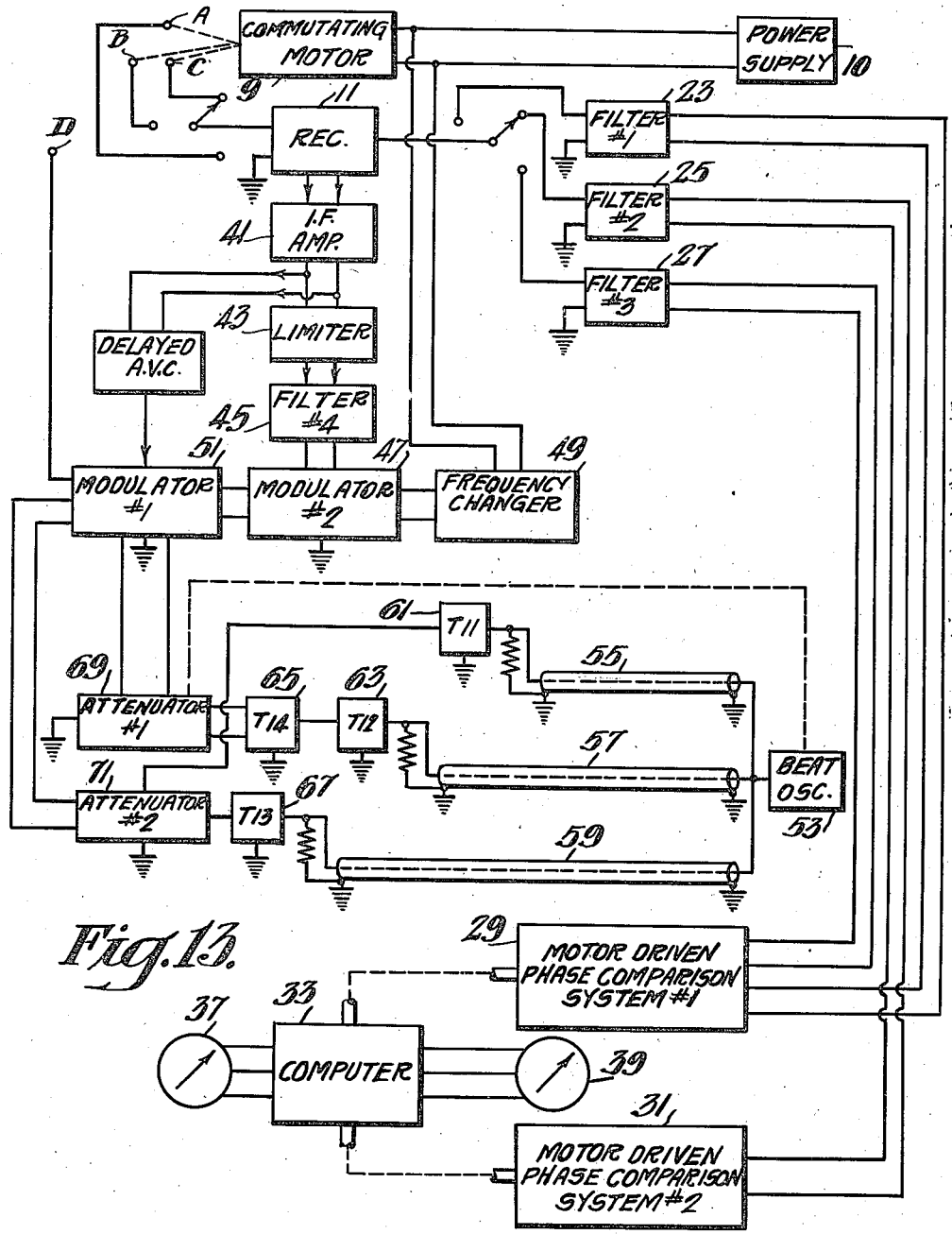

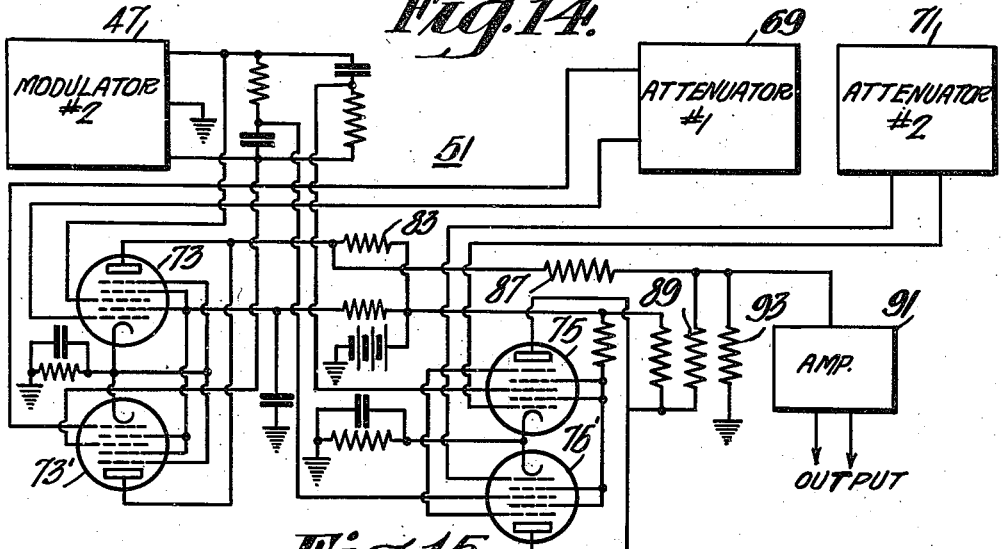
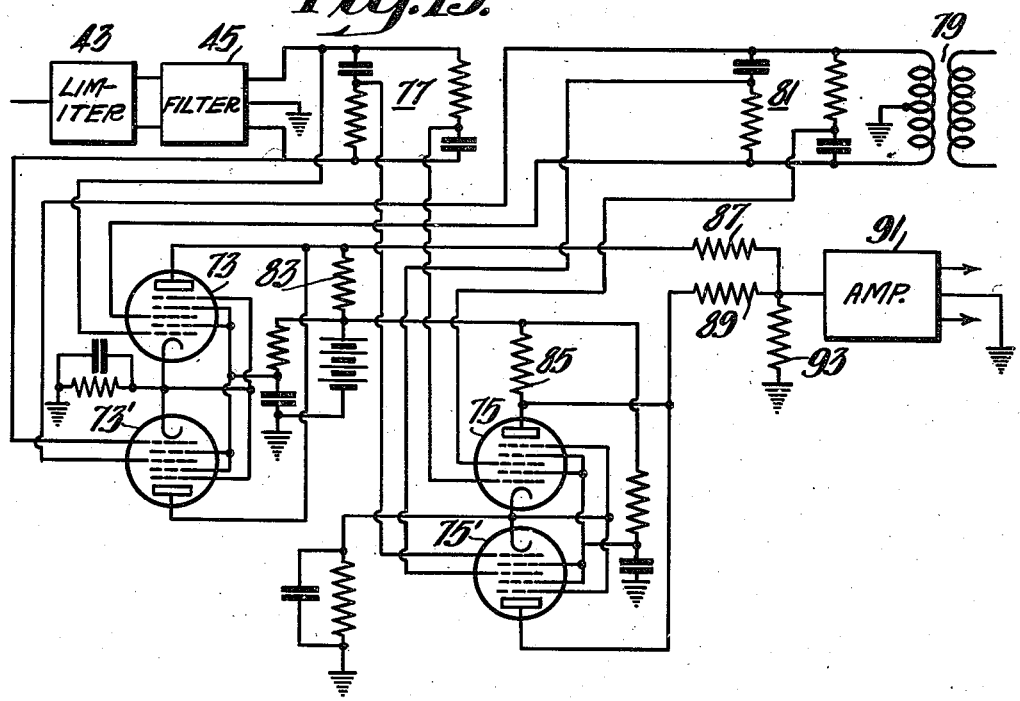

Patented Apr. 16, 1946

2,398,552

UNITED STATES PATENT OFFICE 2,398,552

DIRECTION FINDER

Lowell E. Norton, Princeton, N. J., assignor to Radio Corporation of America, a corporation of Delaware Application December 31, 1942, Serial No. 470,860

5 Claims. (Cl. 250—11)

This invention relates to direction finding and more particularly to the determination of azimuth and elevation angles of arriving waves, without including the delterious effects of mutual coupling between the elements of the collector system.

The operation of a collector system comprising spaced interconnected antenna elements is not completely understood in the present state of the art. Although a single isolated vertical antenna will respond only to vertical electric field components, it is found that an array of such antennas will respond to horizontal electric components to such an extent that serious errors may be introduced in the bearing indications of a conventional direction finder by abnormally polarized or steeply incident waves. One method for avoiding antenna proximity effects is described in U. S. application Serial Number 470,859, entitled Direction finders and filed on Dec. 31, 1942, by L. E. Norton. Sectionalized antenna structures are employed, with commutator means provided for connecting the sections of each structure together periodically to form a continuous vertical conductor. The different antenna structures are connected sequentially, so that only one is operative at any instant. Each antenna section is made short with respect to the wave length at the highest frequency at which the system is to operate, so that the unconnected structures are, in effect, removed from the field to which the connected structure responds.

The principal object of the present invention is to provide an improved method of and means for producing automatically indications of azimuth and elevation of wave arrival employing antenna structures of the above mentioned type.

Another object is to provide a method of and means for securing the desired results with three spaced antenna structures rather than the usual four.

A further object is to provide an improved method of and means for producing visual indications of azimuth and elevation in response to the signals picked up by an array of commutated spaced antenna structures.

The foregoing and other and incidental objects will become apparent to those skilled in the art upon consideration of the following description with reference to the accompanying drawing of which Figs. 1 and 2 are elevational and sectional views respectively of a commutated antenna structure, Fig. 3 is a plan view of an antenna array, Fig. 4 is a schematic block diagram of a direction finder system embodying the invention, Figs. 5, 6 and 7 are graphical representations of the antenna commutation cycles of the system of Fig. 4, Figs. 8 and 9 are graphical representations of voltages produced in the operation of the system of Fig. 4, Fig. 10 is a schematic diagram of a phase comparison device, Figs. 11 and 12 are schematic diagrams of portions of a computer and indicator system, Fig. 13 is a schematic block diagram of a modified embodiment of the invention, Fig. 14 is a schematic circuit diagram of a single side band modulator, Fig. 15 is a schematic diagram of a balanced modulator circuit and Fig. 16 is a plan view of a modified antenna arrangement.

Referring to Figs. 1 and 2, a vertical shaft 1, of insulating material is provided with a plurality of arcuate segments 3 of conductive material, spaced apart longitudinally along the shaft. A plurality of brushes 5 are supported on an insulated vertical rod 7 for engagement with the segments 3, so that upon rotation of the shaft 1 the segments 3 and the brushes 5 cooperate to function as a single vertical conductor during ⅓ of each revolution.

Referring to Fig. 3, three such commutated antennas are provided at points A, B and C, corresponding to the apices of an isoceles right triangle. The shafts 1 are arranged to be driven in synchronism by a motor 9 (see Fig. 4), and are angularly displaced with respect to each other so that only one structure is connected together at any time. The antenna A is connected during the first third of each commutation cycle as illustrated by Fig. 5. The antenna B is connected during the second third of the cycle and the antenna C is connected during the last third, as indicated by Figs. 6 and 7 respectively.

Referring to Fig. 4, the antennas A, B and C are connected to a radio receiver 11 through a three position switch 13. The receiver 11 is of the conventional superheterodyne type, with the exception that the usual oscillator is replaced by a circuit including an I.-F. oscillator 14, an injection oscillator 15 and a balanced modulator 17. An automatic frequency control circuit 18 is connected to the oscillator 15 and is arranged to be controlled by the power source 10 and the output of the receiver 11. The injection oscillator 15 is connected to a relatively small vertical antenna D, positioned at a point equidistant from the antennas A and B. The output circuit of the receiver 11 is connected to a three position switch 19. The switches 13 and 19 are mechanically ganged together as schematically indicated by the dash line 21, and arranged to be driven by the motor 9 synchronously with the commutation of the antennas. The stationary contacts of the switch 19 are connected to filters 23, 25 and 27 respectively.

The output circuits of the first and third filters 23 and 27 are connected to a phase comparison device 29, which includes a motor arranged to rotate an output shaft to an angular position corresponding to the difference in phase between the outputs of the filters 23 and 27. The outputs of the first and second filters 23 and 25 are connected to a second phase comparison device 31 which is identical in construction with the device 29. The output shafts of the phase comparison devices 29 and 31 are connected to a computing device 33, which is arranged to operate two indicators, 37 and 39. The indicator 37 provides an angular indication of the quotient of the angular displacements of the output shafts of the phase comparison devices 29 and 31 and the indicator 39 provides an angular indication proportional to the square root of the sum of the squares of the two shaft displacements.

The operation of the system of Fig. 4 is as follows:

The motor 9 runs synchronously with the frequency of the power source 10, successively commutating the antenna structures A, B and C and connecting them to the receiver 11. The output of the receiver 11 is applied to the filters 23, 25 and 27 in corresponding sequence. The injection oscillator 15 is manually tuned to the approximate frequency of the signal whose bearing is required. The output of the injection oscillator is mixed in the balanced modulator 17 with the intermediate frequency output of the oscillator 14, providing a voltage which differs in frequency from the arriving wave by approximately the intermediate frequency of the receiver 11. The output of the injection oscillator 15 is also applied to the antenna D. This signal, radiated by the antenna D, is picked up by the antennas A, B and C together with the arriving wave. The output of the receiver 11 includes a component equal in frequency to the difference between the frequency of the arriving carrier and the frequency of the oscillator 15. Three such components appear in sequence during each commutation cycle. These components bear the same phase relations with respect to each other as the R.-F. voltages induced in the corresponding antennas bear to each other. The filters 23, 25 and 27 are designed to pass a frequency of $3n/2$ times the frequency of the power supply 10, where $n$ is any integer. This frequency will be referred to hereinafter as the modulation frequency. The output of the receiver 11 is compared in frequency with the power supply 10 by the automatic frequency control circuit 18 to adjust the oscillator 15 to a frequency differing from the incoming carrier frequency by exactly $3n/2$ times the frequency of the power supply. If one antenna were in continuous operation, without commutation the receiver output would comprise a continuous wave of modulation frequency, as shown in Fig. 8.

The inputs to the filters 23, 25 and 27 comprise fractional waves of the modulation frequency, repeated at intervals equal to the period of the antenna commutation cycle, as illustrated in Fig. 9, which represents the output of one of the filters. This wave includes a component of antenna commutation frequency, $\beta/2\pi$, and a component of the modulation frequency, $3\beta/4\pi$. The latter component passes through the filter, while the commutation frequency component is rejected.

Thus the output of each of the filters 23, 25 and 27 comprises a sinusoidal wave of the modulation frequency. The phase of the modulation component of the filter input voltage is independent of the phase of the antenna switching. This may be demonstrated as follows:

Representing the voltage $E_9$ of Fig. 9 by the Fourier series:

$$Eq = a_0 + a_1 \sin \beta t + a_2 \sin 2\beta t + \ldots a_q \sin n\beta t + b_1 \cos \beta t + b_2 \cos 2\beta t + \ldots b_q \cos n\beta t$$

$$a_0 = \frac{1}{a\pi} \int_0^{a\pi} 0 \cdot d\beta t + \frac{3}{2\pi} \int_{a\pi}^{a\pi+\frac{2\pi}{3}} \sin \frac{3n\beta t}{2} d\beta t + \frac{3}{(4-3a)\pi} \int_{a\pi+\frac{2\pi}{3}}^{2\pi} 0 \cdot d\beta t$$

$$= \frac{-1}{n\pi} \left[ \cos \frac{3n\beta t}{2} \right]_{a\pi}^{a\pi+\frac{2\pi}{3}} = 0$$

when $n$ is even, and $$-\frac{2}{n\pi} \cos \frac{3a\pi}{2}$$

when $n$ is odd $$a_n = \frac{1}{a\pi} \int_0^{a\pi} 0 \cdot \sin \frac{3n\beta t}{2} d\beta t + \frac{3}{2\pi} \int_{a\pi}^{a\pi+\frac{2\pi}{3}} \sin \frac{3n\beta t}{2} d\beta t +$$

$$\frac{3}{(4-3a)\pi} \int_{a\pi+\frac{2\pi}{3}}^{2\pi} 0 \sin \frac{3n\beta t}{2} d\beta t$$

$$= \frac{3}{2\pi} \int_{a\pi}^{a\pi+\frac{2\pi}{3}} \cos 0 \, d\beta t - \frac{3}{2\pi} \int_{a\pi}^{a\pi+\frac{2\pi}{3}} \cos 3n\beta t \, d\beta t =$$

$$\frac{3}{2\pi} \left| \beta t \right|_{a\pi}^{a\pi+\frac{2\pi}{3}} - \frac{1}{2\pi n} \left| \sin 3n\beta t \right|_{a\pi}^{a\pi+\frac{2\pi}{3}}$$

$$= 1$$

Similarly, $\quad b_n = \frac{-1}{4\pi n} \left| \cos 3n\beta t \right|_{a\pi}^{a\pi+\frac{2\pi}{3}} = 0$ The phase relation between the modulation frequency component of $E_9$ and the uncommutated modulation $E_8$ (Fig. 8) is the angle $\tan^{-1} b_n/a_n = 0$, i. e., the two voltages are in phase If the commutating time is changed from $a\pi$ to any other value, $b\pi$, the values of $An$ and $Bn$ remain the same, indicating that the phase of the modulation component is independent of the arbitrary phase angle, $a\pi$. The filters 23, 25 and 27 are identical and have the same phase shift at the modulation frequency. Thus the filter output voltages are related in phase to each other in the same manner as the voltages induced in the corresponding antennas by the radiation field.

The potentials from the filters 23, 25 and 27 due to fields at the antennas C, B and A will be $E_9$, $E'_{10}$, $E'_{11}$ respectively.

$$E'_9 = KE \cos \frac{3n\beta t}{2}$$

$$E'_{10} = KE \cos \left( \frac{3n\beta t}{2} - \frac{2\pi d}{\lambda} \cos \psi \sin \theta \right)$$

$$E'_{11} = KE \cos \left( \frac{3n\beta t}{2} - \frac{2\pi d}{\lambda} \cos \psi \cos \theta \right)$$

where E is any reference potential, introduced for notational convenience, K is a coefficient depending on the field intensities, detector characteristics, etc., all of these factors being identical in the three channels, $d$ is the spacing between the antenna C and each of the antennas A and B, $\psi$ is the angle of elevation of wave arrival, and $\theta$ is the azimuth of wave arrival.

The output shaft of the phase comparison device 29 is operated to an angle $\alpha'$ corresponding to the difference in phase between the voltages E'$_9$ and E'$_{11}$ and the shaft of the device 31 is rotated to an angle $\gamma'$, corresponding to the difference in phase between the voltages E'$_9$ and E'$_{10}$. The tangent of the azimuth angle $\theta$ is obtained directly by dividing $\alpha'$ by $\gamma'$ in the device 33, and the angle is indicated on the dial 37. The elevation angle is $$\psi = \frac{\lambda\sqrt{\alpha^2+\gamma^2}}{2\pi d}$$

The indicated operation is performed by the computer 33 which indicates the elevation directly on the face of the device 39.

Referring to Fig. 13, the injection frequency may be produced by deriving a single side band of the carrier frequency. The antenna array, commutator arrangement, modulation filters and the indicator system of Fig. 13 are identical with those shown in Fig. 4 and are designated by identical reference characters. An I.-F. amplifier 41 is connected to the I.-F. circuit of the receiver 11. The output circuit of the amplifier 41 is connected through a limiter 43 and filter 45 to a modulator 47. The filter 45 is designed to pass the I.-F. frequency. The power supply 10 is connected through a frequency changer 49 to the modulator 47. The output of the modulator 49 is connected to a modulator 51. A beat oscillator 53 is connected to the modulator 51 through a phase splitting network comprising transmission lines 55, 57 and 59, amplifiers 61, 63, 65 and 67, and attenuators 69 and 71.

Referring to Fig. 15, the modulator 47 comprises a pair of balanced modulators 73, 73' and 75, 75'. The I.-F. output of the filter 45 is applied directly to the inner control grids of the tubes 73 and 73' and through a 90° phase shifter 77 to the inner control grids of the tubes 75 and 75'. The power supply is connected through a transformer 79 directly to the outer control grids of the tubes 73 and 73' and through a 90° phase shifter 81 to the outer control grids of the tubes 75 and 75'. The anodes of the tubes 73 and 73' are connected to a common load resistor 83, and the anodes of the tubes 75 and 75' are similarly connected to a common load resistor 85. The load resistors 83 and 85 are connected through resistors 87 and 89 respectively to the input circuit of an amplifier 91, which is shunted by a resistor 93. The resistances of the resistors 87 and 89 are relatively high with respect to that of the resistor 93. The amplifier 91 includes a phase inverter arranged to provide push-pull output.

The operation of the circuit of Fig. 15 is as follows:

The resultant output of the modulator 73, 73' across the load resistor 83 comprises the product of sine functions of the power and I.-F. frequencies. The output of the modulator 75, 75' comprises the product of cosine functions of the power and I.-F. frequencies. These two products are added in the resistor 93 to provide a resultant proportional to the sum of the cosine products and the sine products, which is equivalent to a cosine function of the difference in frequency between the two inputs.

Referring again to Fig. 13, the transmission lines 55, 57 and 59 are of different lengths, the length of the line 57 being midway between that of the line 55 and that of the line 59. The output of the oscillator 53 is applied to the three lines in parallel. The lines are terminated in resistors equal in value to the line impedance, in order to prevent reflections. The voltage across the terminating resistor of the line 57 lags that appearing across the resistor of the line 55, and leads the voltage at the termination of the line 59 by the same amount. The outputs of the lines 55 and 59 are applied through the amplifiers 61 and 67 respectively to the attenuator 71, where they are combined in opposition, producing a resultant input to the attenuator 71 which is 90° out of phase with the output of the line 57. The output of the line 57 is applied through the amplifier 63 and 65 and the attenuator 69 to the modulator 51. The attenuator 71 may be varied, for example, by means of a mechanical connection to the tuning control of the oscillator 53, to maintain the amplitude of the quadrature voltage equal to that derived from the line 57.

Referring to Fig. 14, the circuit of the modulator 51 is similar to that of the modulator 47 with the exception that the above described phase splitting network is substituted for the phase splitter 81 of Fig. 15. The operation of the modulator 51 is identical with that of the modulator 47 with the exception that different frequencies are involved. The output of the circuit of Fig. 14 thus comprises a single side band of the output of the beat oscillator 53, at a frequency separated therefrom by the sum of the I.-F. frequency and the modulation frequency. The output current is separated from the carrier frequency by the modulation frequency and is radiated by the antenna D in the same manner as the output of the injection oscillator of the system of Fig. 4. The operation of the remainder of the system of Fig. 13 is identical with that of the system of Fig. 4, and further description is deemed unnecessary.

Referring to Fig. 10, the circuit of the phase comparison systems 29 and 31 comprises a pair of tubes 93 and 95, with their anode circuits connected in push-pull relation to a D.-C. motor 97. Each of the tubes 93 and 95 is provided with inner and outer control grids. The inner control grids are connected through resistors 99 and 101 to one of the control inputs, for example, the output circuit of the filter 23 in the system of Fig. 4. The outer control grids of the tubes 93 and 95 are connected through resistors 103 and 105 and through a 360° phase shifter 107 to a second control input circuit, for example, the output circuit of the filter 25. The phase shifter 107 is mechanically connected to the shaft of the motor 97 as schematically indicated by the dash line 109. The tubes 93 and 95 are provided with a common cathode resistor 111 to bias the tubes to operate at safe average cathode currents. The resistors 99, 101, 103 and 105 are of sufficiently high values to limit grid currents on positive swings of the signal potentials. The resistors 113 and 115, shunted by capacitors 117 and 119, are provided in the output circuits of the tubes 93 and 95. These networks have sufficiently large time constants to integrate the pulsating outputs of the tubes 93 and 95 to operate the motor 97. For phase angles of $\pm\pi/2$ between the two input potentials, the anode potentials of the two tubes will be equal and the motor will be deenergized. For any other phase relation between the two input voltages, the output potential of one tube will be greater than that of the other and the motor will run, driving the phase shifter 107 to such a position that the two inputs are in quadrature phase. Thus the position of the motor shaft is angularly related to the phase angle between the outputs of the filters 23 and 25. The 90° phase shift may be eliminated by 90° displacement of the indicator drive, or by including a 90° phase shifter in one input circuit. As in any servo system, operation of the motor driven phase shifter 107 is not instantaneous. The system hunts, and the 180° ambiguity caused by the fact that balance may occur at either plus or minus $\pi/2$ phase angle is removed, since one of the two balances is unstable. The reason for this is that the motor operation is in the direction to move the phase shifter away from, rather than toward balance. The motor will then operate the phase shifter through 180° around to the stable balance position.

Referring to Fig. 11, the computer mechanism includes a pair of cams 121 and 123 which are connected to the output shafts of the phase comparison devices 29 and 31 respectively through gearing arranged to drive the cam shafts at twice the angular velocities of the corresponding control shafts. The cams 121 and 123 are identical, each comprising two oppositely directed uniform motion surfaces. This arrangement is provided to avoid the necessity for resetting mechanisms which would be required with single cam surfaces and unity gear ratio. A rectangular sheet 125 of opaque material is supported by suitable guides (not shown) to permit motion radially of the cam 121. A cam follower 127 is connected to the sheet 125 and engages the surface of the cam 121. A similar opaque sheet 129 is arranged for rectilinear motion at right angles to that of the sheet 125, and is similarly coupled to the cam 123 by means of a cam follower 131. The sheets 125 and 129 are provided with transverse slots, 133 and 135 respectively, equal in length to the cam lift. As the shafts 29 and 31 are rotated to positions corresponding to the angles $\alpha'$ and $\gamma'$ respectively, the intersection of the slots 133 and 135 move to a position such that a line, 137, drawn from the common median position to the intersection is at an angle $\theta$ whose tangent is $\alpha'/\gamma'$ from the horizontal. The length of the line 137 is proportional to the square root of the sum of the squares of $\alpha'$ and $\gamma'$.

Referring to Fig. 12, the opaque members 125 and 129 are supported between a cathode ray tube 139 and a photo-electric cell 141. A parabolic reflector 143 is arranged so that the photo-cell 141 lies at its focus. An oscillator 145 is connected through a modulator 147 to one deflection circuit of the tube 139, and through a 90° phase shifter 148 to the other deflection circuit. A second oscillator 151 is connected to the modulator 147. The oscillator 145 is also connected to the deflection circuits of a second cathode ray tube 153. The connection to one deflection circuit of the tube 153 includes a 90° phase shifter 155. A third oscillator 157 is similarly connected to a third cathode ray tube 159. The cathode ray tubes 153 and 159 are provided with radial deflection means such as electrodes 161 and 163 respectively. The photo-cell 141 is connected to the electrodes 161 and 163 through an amplifier 165. The output of the oscillator 145 is split by the phase shifter 148 into two quadrature voltages, providing a circular scanning pattern of the beam of the cathode ray tube 139. The radius of this scanning pattern is cyclically varied by means of the oscillator 151 through the modulator 147. Thus the screen of the tube 139 is scanned repeatedly, the luminous spot tracing a spiral path. The screen of the tube 153 is scanned circularly at the frequency of the oscillator 145. As the spot on the screen of the tube 139 coincides in position with the intersection of the slots in the members 125 and 129, a short pulse of light reaches the photoelectric cell 141 producing a corresponding voltage pulse, which is amplified by the amplifier 165 and applied to the radial deflection electrodes 161 and 163. This produces a momentary radial deflection in the scanning pattern of the screen of the tube 153 at an angle corresponding to the angular position $\theta$ of the intersection of the slots 133 and 135, which in turn is the bearing angle to be indicated. The angular velocity of the spot on the screen of the tube 159 is regulated by the frequency of the oscillator 157, which is controlled with the tuning of the direction finder system by means of mechanical connections between the oscillator control and the tuning control. The phase shifter 167 is also connected to the tuning control through a suitable linkage so as to maintain a phase shift of 90° as the tuning is changed. The circular scanning pattern on the screen of the tube 159 is radially deflected at a angle corresponding to the instantaneous radius of the scanning pattern of the tube 139 multiplied by a quantity inversely proportional to the frequency of operation of the direction finder. This quantity is $\lambda/2\pi d$. Thus with the correct mechanical relation between the tuning control and the oscillator 157, the position of the indication on the face of the tube 163 will correspond to the angle of elevation $\psi$.

Numerous modifications of the invention are possible. For example the injection antenna need not be placed at a point equi-distant from the commutated antennas, but may be located anywhere, provided that correct phase delays are included in the channels of two of the commutated antennas. Referring to Fig. 16 the distances from the injection antenna D to the antennas A, B and C are AD, BD and CD respectively. The voltages induced in the antennas A and B by the antenna D are delayed with respect to the voltage in the antenna C by $\phi1$ and $\phi2$ respectively, where $$\phi1 = \frac{2\pi}{\lambda}(AD-CD)$$

and $$\phi2 = \frac{2\pi}{\lambda}(BD-CD)$$

If a phase delay of $\phi2-\phi1$ is inserted in the channel of the antenna A, or a phase advance of $\phi2-\phi1$ is provided in the channel of the antenna B, the operation of the system will be the same as described above.

Thus the invention has been described as a system for automatically producing indications of azimuth and elevation of wave arrival, employing three spaced commutated antenna structures. The voltages induced in said antennas by a radiation field are compared in phase to actuate, through a computing system, azimuth and elevation indicators. Radiation injection of beat frequency for frequency conversion is employed to avoid the effects of random variations of phase shift with frequency in the different antenna channels. The commutated antenna structures are operated sequentially, obviating response to horizontal electric field components caused by antenna proximity effects.

I claim as my invention:

1. A radio direction finder system comprising three antenna structures located at spaced points, each of said structures comprising a series of conductive segments of lengths which are shorter than the shortest wave length at which the system is to operate and commutator means for connecting said segments together to form single vertical conductors in sequence at said points, radio receiver means connected to said antenna structures, three filters, switching means arranged to connect said filters to said receiver means sequentially whereby one of said filters is connected to said receiver simultaneously with the operation of the corresponding one of said antennas, phase difference responsive means connected between the output of the first of said filters and the second of said filters, phase difference responsive means connected between the output of the first of said filters and the third of said filters, indicator means responsive to the quotient of the outputs of said phase difference responsive means, and indicator means responsive to the geometric sum of the outputs of said phase difference responsive means.

2. The invention as claimed in claim 1, wherein said phase difference responsive means comprises a pair of electron discharge tubes, each provided with inner and outer control electrodes, connections from one of said filters to said inner electrodes, connections from the other of said filters through a variable phase shifter to said outer electrodes, a motor connected between the anodes of said electron discharge tubes, and a mechanical connection between the shaft of said motor and said variable phase shifter.

3. The invention as claimed in claim 1 including a local source of radiation, and means for controlling the frequency of said source automatically so as to maintain said frequency at a value different from that of an arriving carrier frequency by $$\frac{3n\beta}{4\pi}$$

cycles per second, where n is any integral number and $\beta/2\pi$ is the frequency of antenna commutation.

4. The invention as claimed in claim 1 wherein said filters are tuned to a frequency $$\frac{3n\beta}{4\pi}$$

where n is any integral number and $\beta/2\pi$ is the frequency of antenna commutation.

5. The invention as set forth in claim 1, including a cathode ray tube, an oscillator coupled to the deflection circuits of said cathode ray tube through a modulator, a second oscillator connected to control said modulator to produce a spiral scanning pattern on the face of said tube, a photoelectric cell positioned in front of the face of said cathode ray tube, a pair of opaque masks between the face of said tube and said photoelectric cell and each provided with a transverse slit, and a mechanical linkage between each of said masks and a corresponding one of said phase difference responsive means including cam means arranged to provide uniform motion of said masks with respect to the angular displacement of the corresponding phase difference responsive means, and wherein said quotient responsive indicator means comprises a second cathode ray tube connected to said first oscillator so as to provide a circular scanning pattern and radial deflection means for said second cathode ray tube connected to said photoelectric cell, and said sum responsive means comprises a third cathode ray tube, an oscillator connected to said third cathode ray tube so as to provide circular scanning on the face of said third cathode ray tube at a rate related to the radial component of the scanning of said first tube by a predetermined ratio, and radial deflection means for said third cathode ray tube connected to said photoelectric cell.

LOWELL E. NORTON.